United States Patent
Lee

(10) Patent No.: US 10,614,027 B2
(45) Date of Patent: Apr. 7, 2020

(54) SERIAL BUS WITH EMBEDDED SIDE BAND COMMUNICATION

(71) Applicant: TSVLink Corp., Los Altos Hills, CA (US)

(72) Inventor: Sheau-Jiung Lee, Saratoga, CA (US)

(73) Assignee: TSVLink Corp., Santa Clara, CA (US)

(*) Notice: Subject to any disclaimer, the term of this patent is extended or adjusted under 35 U.S.C. 154(b) by 136 days.

(21) Appl. No.: 15/155,997

(22) Filed: May 16, 2016

(65) Prior Publication Data

US 2016/0342566 A1    Nov. 24, 2016

Related U.S. Application Data

(60) Provisional application No. 62/163,089, filed on May 18, 2015.

(51) Int. Cl.
 *G06F 13/00* (2006.01)
 *G06F 13/42* (2006.01)
 *G06F 13/40* (2006.01)

(52) U.S. Cl.
 CPC ...... *G06F 13/4295* (2013.01); *G06F 13/4072* (2013.01); *G06F 13/4286* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | | |
|---|---|---|---|---|
| 5,621,455 A | * | 4/1997 | Rogers | H04N 7/0806 348/E11.001 |
| 6,032,185 A | * | 2/2000 | Asano | H04J 14/0227 709/227 |
| 2002/0041637 A1 | * | 4/2002 | Smart | H04L 27/2602 375/316 |
| 2006/0145853 A1 | * | 7/2006 | Richards | G01S 13/0209 340/572.1 |
| 2007/0259628 A1 | | 11/2007 | Carmel | |
| 2011/0249678 A1 | | 10/2011 | Bonicatto et al. | |
| 2013/0016736 A1 | * | 1/2013 | Parnaby | H04L 12/12 370/465 |
| 2013/0022150 A1 | | 1/2013 | McCune | |
| 2015/0010307 A1 | * | 1/2015 | Zhong | H04B 10/25754 398/68 |

FOREIGN PATENT DOCUMENTS

| | | |
|---|---|---|
| JP | S 55-75362 A | 6/1980 |
| JP | 2000 295189 | 10/2000 |
| JP | 2003 134070 A | 5/2003 |
| WO | 2014 074301 A1 | 5/2014 |
| WO | 2014 189651 | 11/2014 |

* cited by examiner

Primary Examiner — Henry Tsai
Assistant Examiner — Dean Phan
(74) *Attorney, Agent, or Firm* — DLA Piper LLP (US)

(57) ABSTRACT

A serial bus is disclosed. In one embodiment, data is transmitted over the serial bus using quadrature amplitude modulation. Other information, including synchronization information, is sent concurrently with the data using a different modulation technique, such as baseband or DC amplitude modulation.

5 Claims, 6 Drawing Sheets

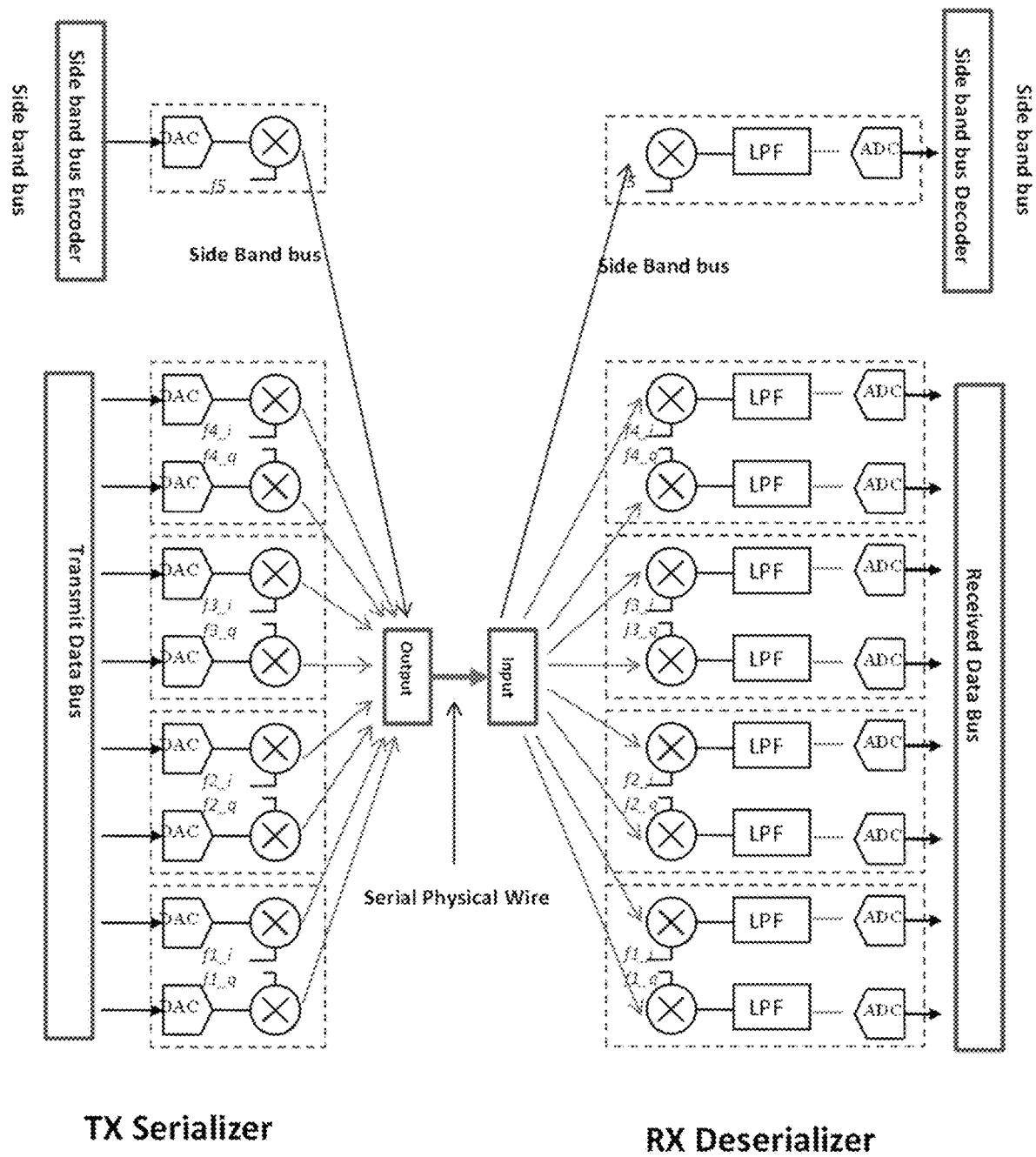
Figure 1, Side Band Bus and Data Bus

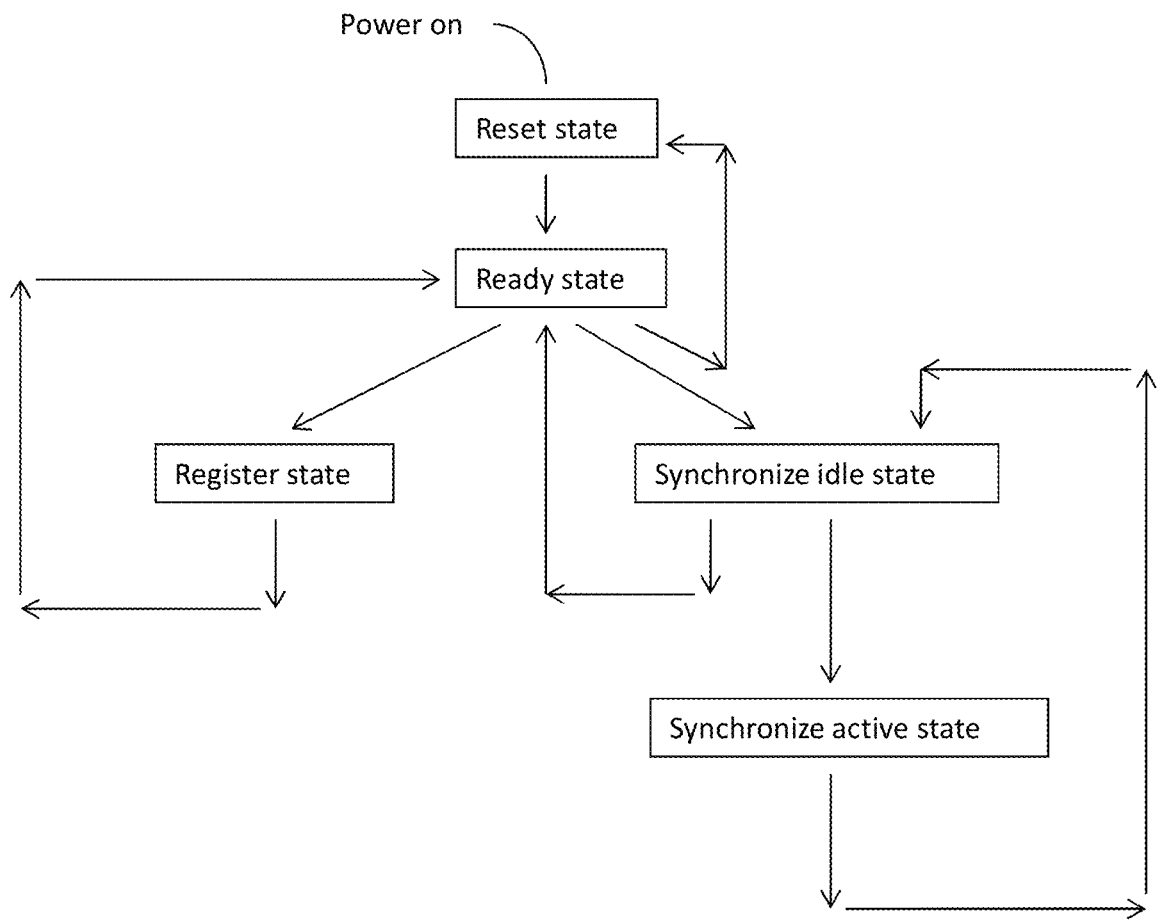
Figure 2, State Transitions of Side Band Bus

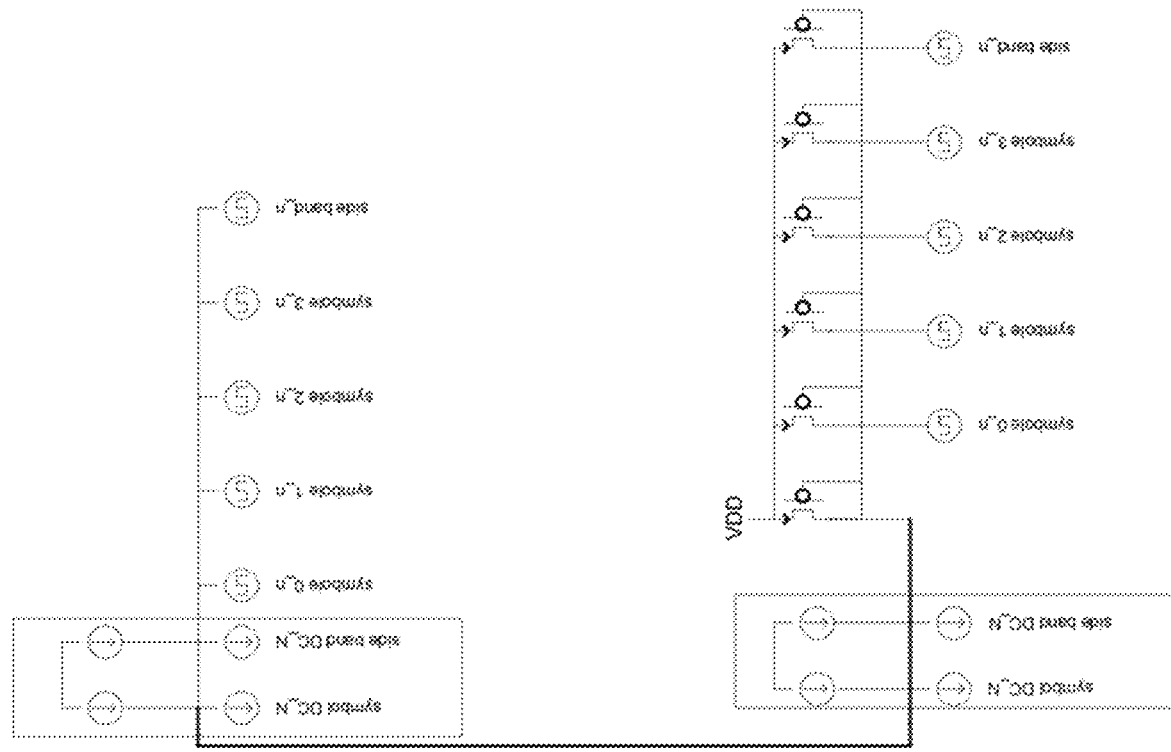
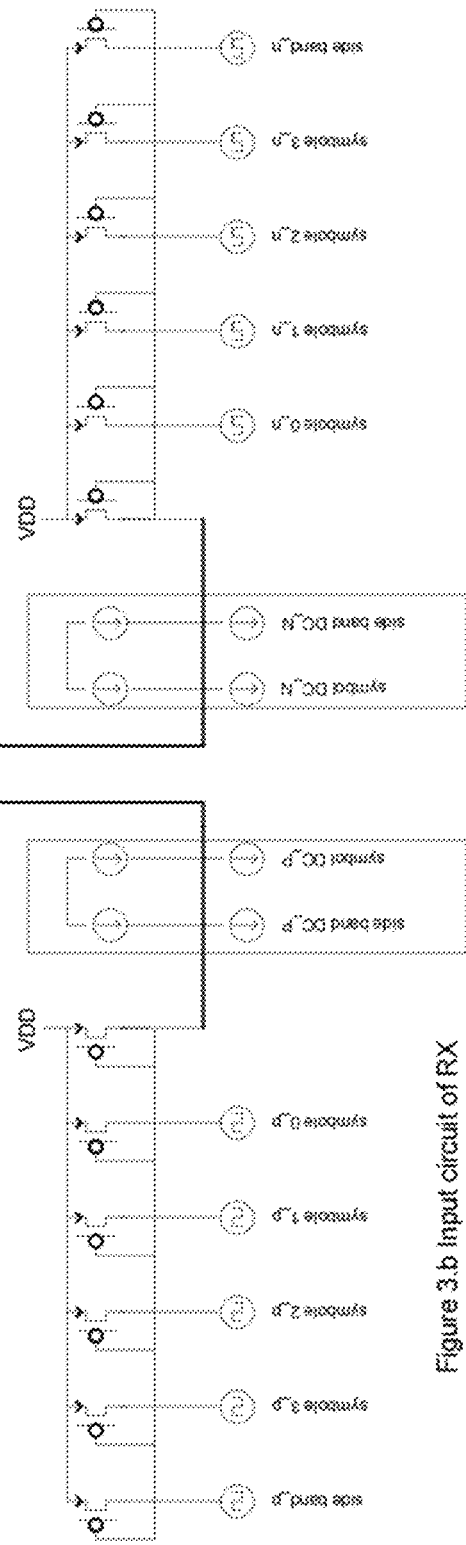

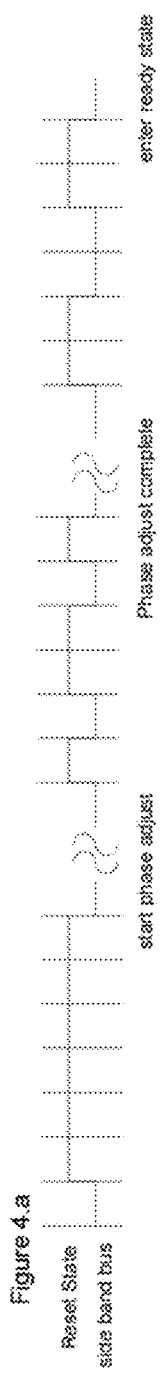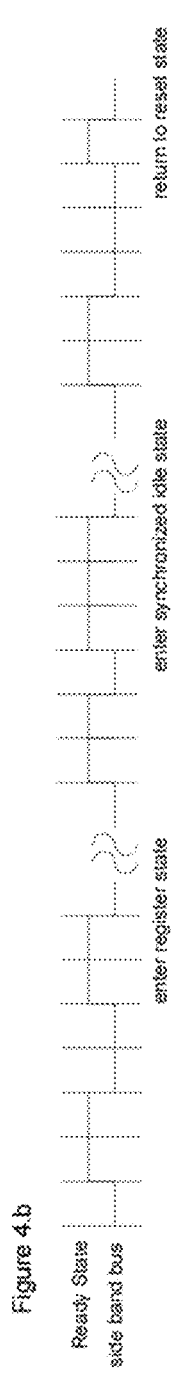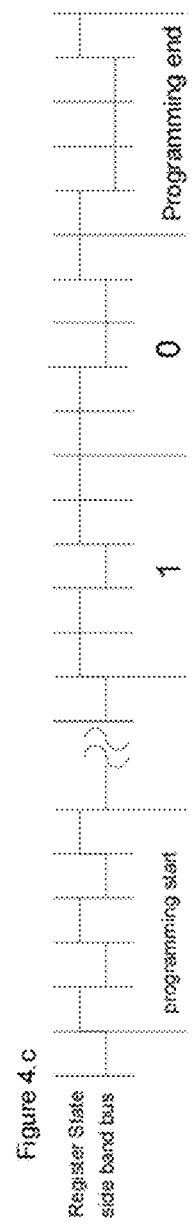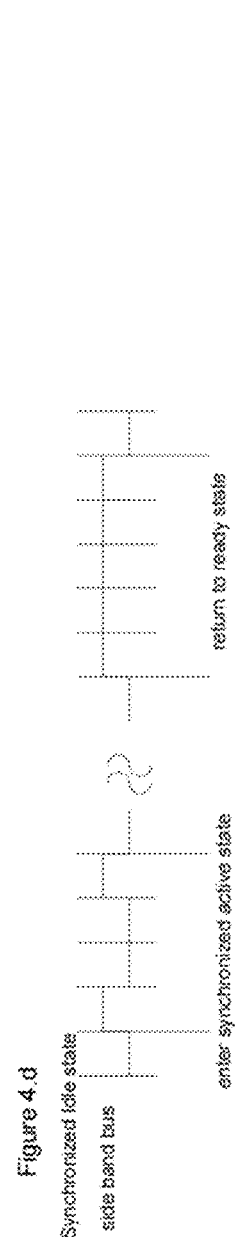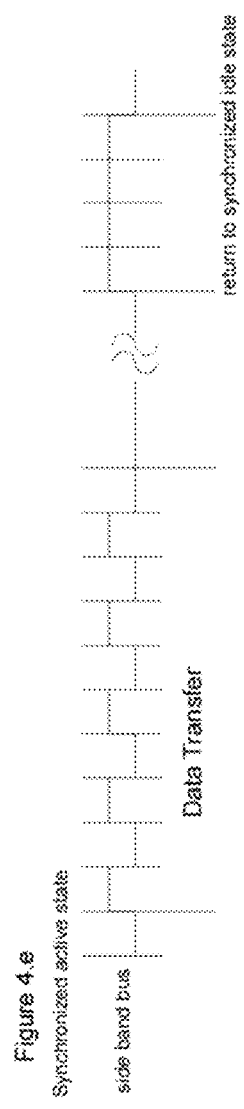

SERIAL BUS WITH EMBEDDED SIDE BAND COMMUNICATION

PRIORITY CLAIM

This application claims priority to U.S. Provisional Application No. 62/163,089, filed on May 18, 2015, and titled "Serial Bus with Embedded Side Band Communications," which is incorporated herein by reference.

TECHNICAL FIELD

A serial bus for electrical communication is disclosed.

BACKGROUND OF THE INVENTION

Serial buses are known in the prior art. Examples of serial buses include USB, HDMI, DVI, and SATA buses. In prior art serial buses, when the serializer, TX, and deserializer, RX, are used for serial data communication, the circuits must synchronize between TX and RX through communicating a set of protocols to establish a synchronized state before starting data transfer. The synchronization process includes tasks such as equalization, clock recovery, type of transfer, length of data transfer, client identification, cyclic redundancy check, master request, client grant, and other system predefined tasks. Due to the nature of serial link communication, this synchronization cannot be done by adding extra physical wires of side band bus to reduce power consumption or to shorten the latency. Traditionally, such side band communication is implemented within existing serial physical wires by partitioning the transfer cycle into transfer header sessions (side band bus communication) and transfer block data sessions (data bus communication). This type of side band communication bus implementation results in not only high power consumption but also long latency of data transfer due to the fact that side band communication must occupy a portion of the total transfer time in serial link communication and serial link must be in full power to perform the transfer header sessions. Side band communication often consumes 20-30% of the total transfer time. Data cannot be transferred during that period, which is a significant limitation of prior art serial buses.

SUMMARY OF THE INVENTION

The embodiments described herein comprise an improved serial bus architecture and associated serializer and deserializer structures. The embodiments implement an embedded side band communication bus using the property of concurrent communication provided by multi frequency band QAM SerDes (serializer and deserializer). This implementation can not only reduce power consumption but also latency to establish the communication state for serial data transferring.

BRIEF DESCRIPTION OF THE DRAWINGS

FIG. 1 depicts an embodiment of a serializer and deserializer communicating over a serial bus that comprises a data bus and a side band bus.

FIG. 2 depicts an embodiment of the state transitions of the side band bus.

FIG. 3A depicts output circuitry of a serializer.

FIG. 3B depicts input circuitry of a deserializer.

FIGS. 4A, 4B, 4C, 4D, and 4E depict content transmitted over the side band bus during various state transitions.

DETAILED DESCRIPTION OF THE PREFERRED EMBODIMENTS

Figure 5:
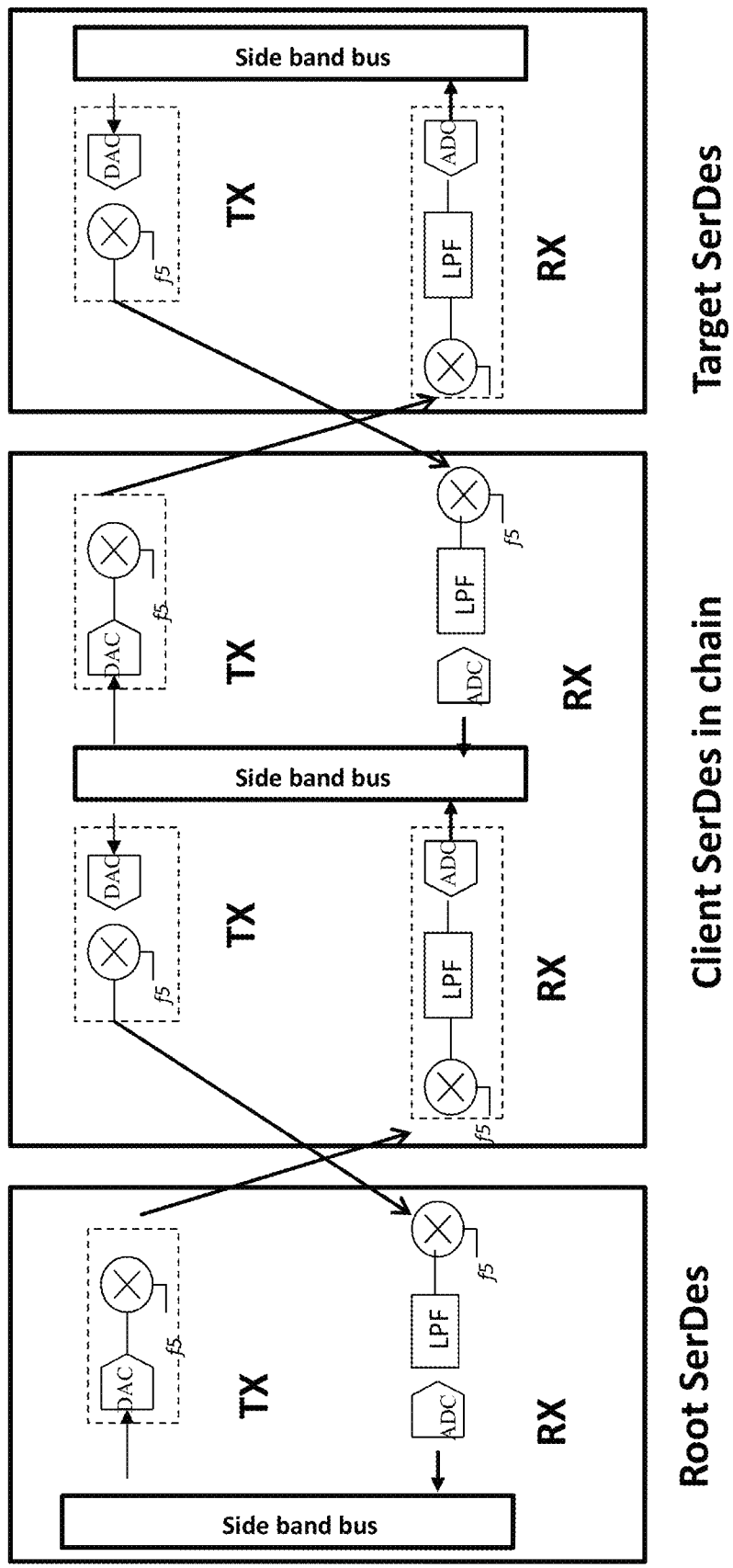
FIG. 5 depicts three devices communicating in a chained fashion over a serial bus.

FIG. 1 shows an embodiment of a multi frequency band quadrature amplitude modulation (QAM) SerDes to implement a data bus and embedded side band bus. The data bus and the side band bus are concurrently connected by a serial physical wire. The data bus in this embodiment utilizes multi frequency band QAM. The side band bus in this embodiment utilizes another frequency of either base band or amplitude modulation (AM).

The QAM scheme for the data bus allows a high throughput data rate via the serial physical wire. However the QAM scheme requires a more complicated phase synchronization algorithm as stated in other serial bus architectures. Thus, the side band bus communication must be established before executing the phase synchronization algorithm. Because the embodiments implement the side band bus and data bus using the same serial physical wire, the serializer and deserializer attached to that serial physical wire must be able to communicate with each other without phase synchronization. In FIG. 1, the side band bus is implemented using mixing frequency 5 carrier without i-phase and q-phase. The frequency 5 carrier can be either DC (base band) or another frequency (AM) modulation. In either configuration, the side band bus does not need phase synchronization. This allows the side band bus to be instantaneously established once the serializer circuit and deserializer circuit are powered on.

Thus, in FIG. 1, a side band bus and a data bus are combined over one serial bus implemented by a single physical wire or wire pair. The serial bus can be conceptualized as a serial data bus with an embedded side band bus. Every cycle of the side band bus starts with the side band bus encoder encoding the bus protocol based on the current bus state. Then bus encoder generates a series of binary bit or multi level bits and provides them to a DAC (digital-to-analog converter) after performing the encoding bus protocol. The output of the DAC will be transmitted through physical wires of the transmitter in either base band or AM modulation.

The bus signals from the transmitter will be received by the receiver, which will perform demodulation. An ADC (analog-to-digital converter) restores the encoding bus signal back to binary bit or multi level bit. The output of the ADC is decoded by side band bus decoder and the full bus protocol is received by the receiver. The side band bus is then established between transmitter and receiver.

In one embodiment, the serial physical wire comprises two metal wires that will together contain differential signals to implement the serial communication.

Once the side band bus is established after power on, the bus protocols can be implemented through a series of encoding pulses for communication between TX and RX. Table 1 depicts one example of a side band bus protocol encoding. The side band bus state can be optimized for the desired application. Table 1 shows a bus state that is optimized for power consumption and fast response. Each state has an unique coding within the side band protocol.

TABLE 1

Side Band Bus Protocol Encoding

| | | |
|---|---|---|
| Reset State | 111111 | Phase adjust request |
| | 101101 | Phase adjust complete |
| | 110011 | Enter Ready state |
| | 000000 | Bus idle |
| Ready state | 110111 | Request to enter synchronize |
| | 110011 | Enter Register programming |
| | 110001 | Return to reset state |
| Synchronized idle state | 1001 | Request active state to power on RX |
| | 1111 | Return to ready state |
| | 0000 | Bus idle |
| Synchronized active state | 10 | Data transfer |
| | 1111 | Request idle state to power down RX |
| Register state | 10101 | Programming start |
| | 10001 | Programming end |
| | 11011 | Digital 1 |
| | 11001 | Digital 0 |
| | 11111 | Return to ready state |
| | 00000 | Bus idle |

FIG. 2 shows a state transition diagram for the states represented in Table 1. After power on, the TX and RX enter the reset state in which one of the devices will request synchronization and adjustment between TX and RX. After completion of synchronization and adjustment, the TX and RX enter the ready state through a side band bus command. Once the TX and RX are in the ready state, one of the devices will instruct to perform either data transferring or register programming. The register programming is executed during the register state and data transferring is executed during synchronized state.

After entering the register state, the encoding scheme in Table 1 shows how to send digital bit through serial side band bus. Through combination of encoded digital bits, the circuits allow TX to access all registers within RX and configure RX accordingly.

During the ready state, only the side band bus is active and operates in base band frequency. The output circuit and input circuit can be in low power state to reduce the power consumption. If there is no need to program a register, the side band bus asserts command to enter synchronize idle state and ready for data transfer through the serial physical wire.

During the synchronized idle state, the input/output circuit remains in a low power consumption mode while waiting for the side band bus to issue data transfer request.

Once the TX/RX enters a synchronized active state requested by side band bus, the circuit will be in a power on mode to transmit the data between TX/RX. During a synchronized active state, TX and RX are in a power on mode and this state will consume most of power. The power saving scheme of SerDes is done by controlling when to enter a synchronize active state and when to return to a synchronize idle state.

FIG. 3.a shows a dynamic power saving output circuit of TX and FIG. 3.b shows a dynamic power saving circuit of RX. The circuits shows a schematic of differential current output buffer and differential current input buffer. There are two DC bias currents, one for side band bus and the other for data transferring. A high DC bias current is used during data transfer to perform high speed signal communication. Only in the synchronized active state is signal communication at high speed. The high DC bias current of data transferring is turned on to perform the high speed signal communication. Normally, only a small side band DC bias current is turned on. This design allows power saving when the TX and RX circuit are in an idle state.

FIG. 4.a shows the side band bus in a reset state to start the phase adjustment, complete the phase adjustment and enter the ready state. FIG. 4.b shows the side band bus in a ready state to enter a register state, enter a synchronized idle state, and return to a reset state. FIG. 4.c shows the side band bus in the register state to start programming and write 1, 0 through side band bus. It also shows the programming end after writing 1, 0. FIG. 4.d shows the side band bus in synchronized idle state to enter synchronized active state and return to ready state. FIG. 4.e shows the side band bus in synchronized active state to transfer data and return to synchronized idle state.

FIG. 5 shows a configuration involving three devices coupled over the serial bus. The embedded bus in root SerDes can be expanded to a target SerDes through a client SerDes in the middle of a SerDes chain. In this configuration, a SerDes can function as a hub of next level of SerDes and passing embedded bus protocol from higher level to lower level. An embedded bus such as a PCI bus, AXI bus, AHB bus and Wishbone bus etc. can be expanded to the lower level of SerDes through a chain configuration in FIG. 5. This invention provides short latency and eliminates the need of decoding packet commands, and SerDes with an embedded bus can be used to glue a chip set of different functions to function like a fully integrated system-on-chip.

Figure 6:
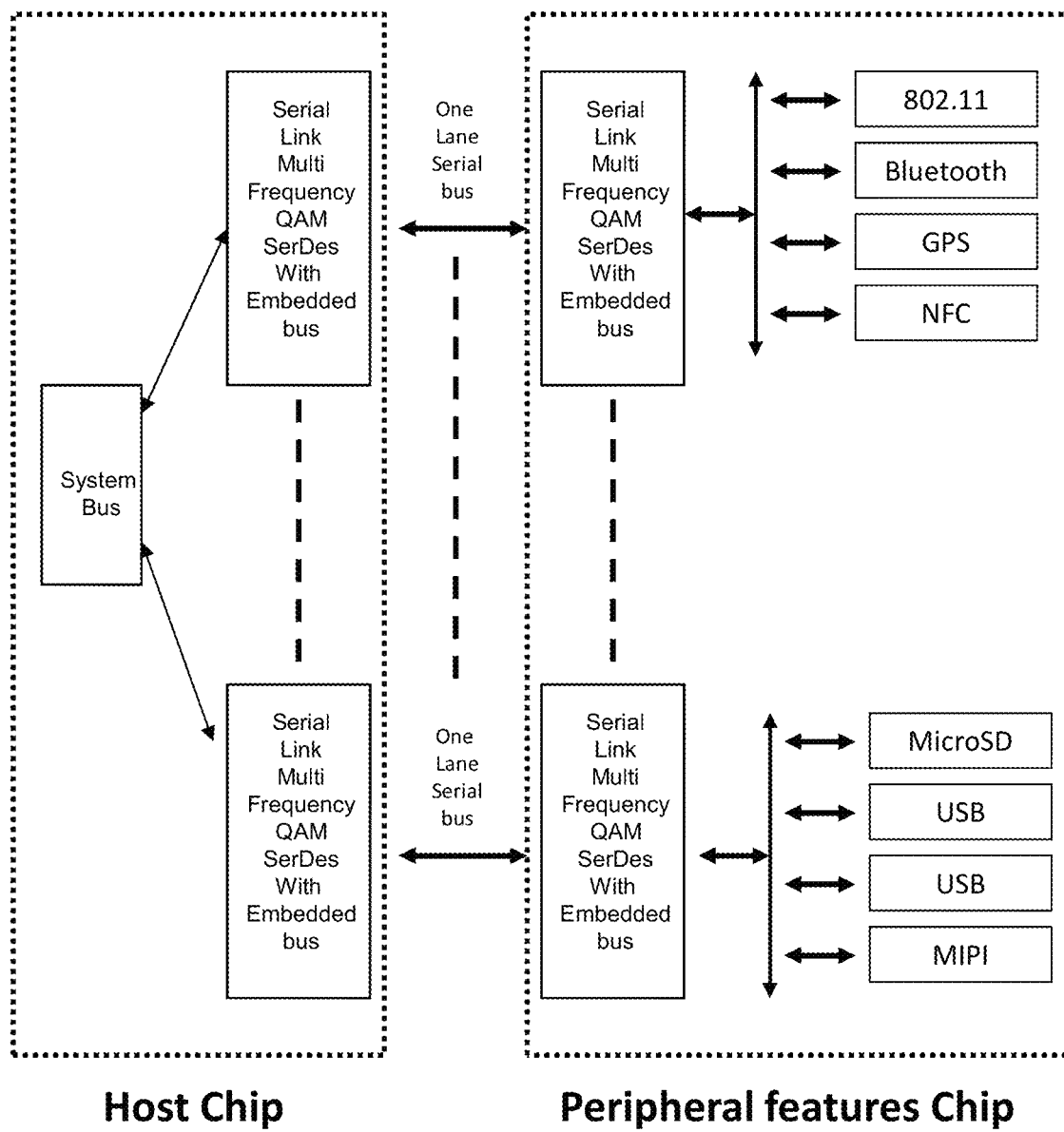
FIG. 6 depicts two chips communicating over multiple serial buses.

FIG. 6 shows a system that uses a plurality of serial buses to connect multiple chips within a chip set, here a host chip and peripheral features chips, for a computing system. Multiple core processing units and hardware accelerator units are in a host chip. The peripheral functions such as WiFi, bluetooth, GPS, near field connection, microSD port, USB port, MIPI port etc. are in a peripheral features chip. Multiple core processing units and hardware accelerator units access the system resources directly through a system bus. The system bus also connects the peripheral functions through multiple serial buses.

In FIG. 6, an example is shown where each serial bus comprises a base band carrier of an embedded command bus and four carriers of a data bus for four different peripheral functions. The host processing units manage peripheral functions through the embedded command buses and then perform data transfer to and from each peripheral device concurrently through the separated carrier within each serial bus. In this way, a large number of peripheral functions can be concurrently processed by multiple serial buses to achieve maximum data throughput. Based on the silicon fabrication process node, the system be partitioned into a chipsets which are connected through multiple serial buses to achieve an optimized combination of performance, power and cost.

In summary, unlike in the prior art, data and synchronization information can be sent concurrently over a single serial bus instead of through separate header and data periods. In the embodiments described herein, the side band bus can be implemented using a multi-frequency band QAM SerDes by adding a base band carrier or an AM modulating carrier. This is shown in FIG. 1. The side band bus does not require any phase adjustment after the circuit is powered on. The side band bus can be implemented by encoding into multi level or series of digital bits. The example of such encoding is shown in Table 1. SerDes can enter different states to perform assigned task, shown in FIG. 2, through various side band bus commands. The power savings of SerDes can be implemented by combining the dynamic power input/output circuit shown in FIG. 3 with operating SerDes in different states shown in FIG. 2. The only high power consuming state in FIG. 2 is the synchronized active state. Once SerDes enters the synchronized active state, SerDes can operate with short latency and high data throughput. FIG. 4 shows an example of side band bus commands in various states with encoding digital bits commands. FIG. 5 shows an application example to expand the internal bus of root SerDes to target SerDes with short latency and glue all client SerDes to function like a fully integrated system-on-chip. FIG. 6 shows an example of a chip set comprising a host chip and peripheral feature chip, which can be integrated through multiple serial buses. This allows the processing units to concurrently manage all peripheral functions through serial embedded buses and data buses from multiple frequency band carriers.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A method of operating a serial bus using a transmitter connected to a receiver over the serial bus, the method comprising:
    powering on the transmitter and receiver;
    synchronizing the transmitter and receiver by transmitting synchronization information from the transmitter to the receiver over the serial bus using a first modulation technique, the serial bus comprising a physical wire or physical wire pair;
    issuing a data transfer request from the transmitter to the receiver over the serial bus using the first modulation technique;
    transmitting data from the transmitter to the receiver over the serial bus using a second modulation technique different than the first modulation technique, wherein a first DC bias current is applied to the serial bus during the transmitting step; and
    entering a synchronized idle state wherein the transmitter and receiver enter a low power mode while the transmitter continues to transmit synchronization information but not data to the receiver over the serial bus, wherein a second DC bias current smaller than the first DC bias current is applied to the serial bus during the synchronized idle state.

2. The method of claim 1, wherein the first modulation technique is amplitude modulation and the second modulation technique is multi frequency band quadrature amplitude modulation.

3. The method of claim 1, wherein the first modulation technique is baseband modulation and the second modulation technique is multi frequency band quadrature amplitude modulation.

4. The method of claim 1, wherein the synchronization information comprises one or more of equalization, clock recovery, type of transfer, length of data transfer, client identification, cyclic redundancy check, master request, and client grant information.

5. A communication system, comprising:
    a serial bus comprising a physical wire or wire pair;
    a transmitter for modulating one or more bus commands using a first modulation technique to generate a first modulated signal and for modulating data using a second modulation technique different than the first technique to generate a second modulated signal and for transmitting the first modulated signal and the second modulated signal concurrently over the serial bus without using separate header and data periods; and
    a receiver for receiving and demodulating the first modulated signal to obtain the one or more bus commands and for receiving and demodulating the second modulated signal to obtain the data;
    wherein the transmitter comprises one or more digital-to-analog converters for converting the data from digital to analog form and a power saving circuit for applying a first DC bias current when the one or more bus commands are being transmitted and for applying a second DC bias current, higher than the first DC bias current, when the data is being transmitted; and
    wherein the receiver comprises a power saving circuit for applying a first DC bias current when the one or more bus commands are being received and for applying a second DC bias current, higher than the first DC bias current, when the data is being received.

* * * * *